(12) United States Patent
Mann et al.

(10) Patent No.: US 10,015,447 B2
(45) Date of Patent: Jul. 3, 2018

(54) TRANSMITTING MULTIMEDIA STREAMS TO USERS

(71) Applicant: HEWLETT-PACKARD DEVELOPMENT COMPANY, L.P., Houston, TX (US)

(72) Inventors: James M Mann, Houston, TX (US); Charles J Stancil, Houston, TX (US); Robin T Castell, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/542,826

(22) PCT Filed: Mar. 31, 2015

(86) PCT No.: PCT/US2015/023639
§ 371 (c)(1),
(2) Date: Jul. 11, 2017

(87) PCT Pub. No.: WO2016/159984
PCT Pub. Date: Oct. 6, 2016

(65) Prior Publication Data
US 2018/0013982 A1    Jan. 11, 2018

(51) Int. Cl.
*H04N 7/15*     (2006.01)
*H04L 29/06*    (2006.01)
*H04N 7/14*     (2006.01)

(52) U.S. Cl.
CPC ......... *H04N 7/152* (2013.01); *H04L 65/1093* (2013.01); *H04L 65/4038* (2013.01); *H04L 65/604* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 6,753,900 B2 | 6/2004 | Runcie et al. | |
| 8,117,275 B2 | 2/2012 | Hughes | |
| 8,144,633 B2 | 3/2012 | Yoakum et al. | |
| 8,625,769 B1 | 1/2014 | Allen et al. | |
| 2004/0008249 A1* | 1/2004 | Nelson .................. | H04N 7/147 348/14.09 |

(Continued)

FOREIGN PATENT DOCUMENTS

EP     2007141     12/2008

OTHER PUBLICATIONS

Miguel, T.P.D. et al.; "Advanced Collaborative Services Over Broadband Networks: the Isabel Experience"; May 15, 2008; 14 pages.

*Primary Examiner* — Creighton Smith
(74) *Attorney, Agent, or Firm* — HPI Patent Department (57) ABSTRACT

Examples disclosed herein provide the ability for remote participants in a collaborative workspace to hear and view specified participants in a conference room. In on example, a computing device may receive streams of content from devices located in a room, and receive requests from users. As an example, each user request is for accessing a subset of the streams of content. For each user request, the computing device may join the requested subset of the streams of content into a single multimedia stream, and transmit each single multimedia stream to respective users.

10 Claims, 3 Drawing Sheets

(56) References Cited

U.S. PATENT DOCUMENTS

| | | |
|---|---|---|
| 2006/0251384 A1 | 11/2006 | Vronay et al. |
| 2012/0169835 A1 | 7/2012 | Woo |
| 2012/0320146 A1* | 12/2012 | Civanlar .............. H04L 12/4604 |
| | | 348/14.09 |
| 2013/0188007 A1 | 7/2013 | Duong |
| 2014/0181683 A1* | 6/2014 | Lim ...................... H04L 63/105 |
| | | 715/740 |
| 2014/0218462 A1 | 8/2014 | Kao et al. |
| 2015/0022625 A1 | 1/2015 | Thapa |
| 2016/0227165 A1* | 8/2016 | Moorjani ................. H04N 7/15 |
| 2016/0227168 A1* | 8/2016 | Vendrow ................ H04N 7/152 |
| 2017/0324934 A1* | 11/2017 | Barkley ................... H04N 7/15 |

* cited by examiner

TRANSMITTING MULTIMEDIA STREAMS TO USERS

BACKGROUND

When a meeting is held in a conference room, a number of participants may not be able to attend. Collaborative workspaces are inter-connected environments in which participants in dispersed locations can interact with participants in the conference room. The environment may be supported by electronic communications and groupware, which enable participants to overcome space and time differentials. Improvements in processing capabilities and the widespread availability of high speed internet allow for synchronous communications between the participants at the various locations.

DETAILED DESCRIPTION

Examples of synchronous communications include, but are not limited to, voice and video services. As an example, the conference room may include cameras that transmit video images from that location to the other locations, for example, where the remote participants reside. Similarly, the dispersed locations may include cameras that transmit video images to the other locations. As a result, the participants at the various locations may be able to have a face to face conversation with participants in the conference room, as if they were themselves in the conference room. Similarly, the conference room and the dispersed locations may include microphones to transmit audio between the locations. Each location may include any number of cameras and microphones, for example, based on the size of the room at the location or the number of participants at the location. As various participants in the conference room may speak at the same time, and as participants may move around in the conference room, issues may arise where participants remote from the conference room may have difficulty viewing or hearing a particular participant speaking in the conference room.

Examples disclosed herein provide the ability for remote participants in a collaborative workspace to hear and view specified participants in a conference room. As an example, the system disclosed herein may provide audio/video feeds individually customized for each remote participant, based on the participants in the conference room that each remote participant may desire to follow. As multiple participants may be in the conference room, and considering that remote participants may desire to follow different participants in the conference room, the system allows each remote participant to select appropriate audio/video feeds in order to have a better view or audio feed on their participant(s) of interest.

Figure 1:
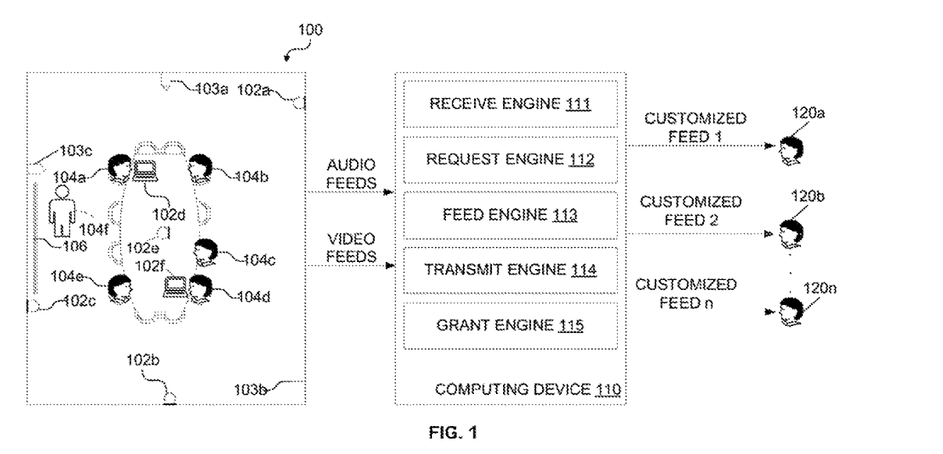
FIG. 1 illustrates a collaborative workspace, where participants remote from a conference room receive individually customized audio/video feeds of participants in the conference room, according to an example.

With reference to the figures, FIG. 1 illustrates a collaborative workspace, where participants 120a-120n remote from a conference room 100 receive individually customized audio/video feeds of participants in the conference room 100, according to an example. The participants in the conference room 100 may include participants 104a-104e seated around a conference table and participants 104f that may move around in the conference room 100. The conference room contains a number of recording devices that can include video cameras 103a-103c and microphones 102a-102f distributed about the perimeter and within the conference room 100. The microphones 102a-102f may belong to at least one microphone array that operates the microphones in tandem. Examples of the microphones 102a-102f include omnidirectional microphones, directional microphones, or a mix of omnidirectional and directional microphones distributed within the conference room 100. The arrangement and number of the microphones 102a-102f and video cameras 103a-103c in the conference room 100 are not limited to what is illustrated.

As an example, the video cameras 103a-103c and microphones 102a-102f may be part of a provided in-room conferencing system, or they could also be from a collection of cameras or microphones from client devices of individual users (e.g., notebooks, tablets, and smartphones). For example, participant 104a and participant 104d may have devices joined to the collaborative workspace with the ability to capture audio and/or video. As illustrated, microphone 102d on the device of user 104a and microphone 102f on the device of user 104d may be made available to the remote participants 120a-120n as an option for receiving audio feeds from the conference room 100. Although not illustrated, webcams on the devices of participants 104a, 104d may also be made available to provide video feeds to the remote participants 120a-120n.

As mentioned above, collaborative workspaces make it possible for remote participants in dispersed locations to interact with participants in the conference room 100 via their respective devices. As will be further described, the video cameras 103a-103c and the microphones 102a-102f may be linked to a computing device 110 that receives the video and audio feeds, and manipulates the feeds to individually customized feeds for each remote participant 120a-120n, made available on their respective devices that are joined to the collaborative workspace. Considering that remote participants may desire to follow different participants in the conference room 100, this system allows each remote participant 120a-120n to select appropriate audio/video feeds in order to have a better view or audio feed on their participant of interest.

Computing device 110 represents generally any computing device or group of computing devices configured to send and receive network requests, send and receive data (e.g., the audio/video feeds), and/or otherwise communicate with user devices of the remote participants 120a-120n. As used herein, "computing device" may be a remote web server, server, computer networking device, chip set, desktop computer, notebook computer, workstation, or any other processing device or equipment. As an example, such communications may take place via the Internet. For example, the user devices of the remote participants 120a-120n may communicate with the computing device 110 via the Internet using a wireless or mobile communications technology, such as Wi-Fi, 3G, or 4G. However, some or all of the communications between the recording devices in the conference room 100, the computing device 110, and the user devices of the remote participants 120a-120n may involve wired communications.

User devices of the remote participants 120a-120n that are used to join collaborative workspaces represent generally a smartphone, tablet computer, notebook computer, or any other mobile computing device configured to send and receive network requests, send and receive data (e.g., receiving the individually customized audio/video feeds), and/or otherwise communicate with the computing device 110 via the Internet. As an example, the computing device 110 may provide the capabilities described herein as a service for an application stored on the user devices for the remote participants 120a-120n to interact with. For example, the remote participants 120a-120n may download and install the application on their devices in order to join collaborative workspaces and interact with the capabilities provided by the computing device 110 that are described below.

In FIG. 1, various components of the computing device 110 are identified as engines 111-115. In describing engines 111-115, focus is on each engine's designated function. However, the term engine, as used herein, refers to a combination of hardware and programming configured to perform a designated function. As is illustrated later with respect to FIG. 2, the hardware of each engine, for example, may include one or both of a processor and a memory device, while the programming contains machine instruction (e.g., code) stored on that memory device and executable by the processor to perform the designated function. The programming can include an operating system and application. In addition, the hardware of each engine can include a display and any user input buttons.

Referring to FIG. 1, the computing device 110 includes a receive engine 111, request engine 112, feed engine 113, transmit engine 114, and grant engine 115. Receive engine 111 represents a combination of hardware and programming configured to receive streams of content from recording devices located in the conference room 100. As illustrated, the computing device 110 may receive audio feeds from the microphones 102a-102f and video feeds from the video cameras 103a-103c. Although the microphones 102a-102f may belong to at least one microphone array that operates the microphones in tandem, the computing device 110 may receive separate audio feeds from each microphone, granting remote participants the ability to select different audio feeds for following participants in the conference room 100, as will be further described. Similarly, the computing device 110 may receive separate video feeds from each video camera 103a-103c.

Request engine 112 represents a combination of hardware and programming configured to receive requests from the remote participants 120a-120n. As an example, each request is for accessing a subset of the streams of content (e.g., the audio and/or video feeds), based on the participants in the conference room 100 that each remote participant desires to follow. As a result, instead of transmitting the same multimedia stream to the remote participants 120a-120n, each remote participant has control over the audio and/or video streams they receive on their respective devices. As will be further described, control of the media transfers predominantly to the hands of each remote participant, allowing the remote participants 120a-120n to better control their respective experiences and, thus, their participation in the meeting in the collaborative workspace. As an example, the selection of the subset of streams that a remote participant desires to access on their device may be made via an application. As mentioned above, the application may be downloaded and installed on the device in order to join a collaborative workspace and interact with the capabilities provided by the computing device 110.

With regards to video streams, each remote participant may desire to view different video feeds. As an example, the application may provide a preview of the various video feeds available, for example, from video cameras 103a-103c, allowing each remote participant to select their preferred video feed. As an example, remote participant 120a may desire to view video footage of participant 104f, particularly when participant 104f is presenting in front of a presentation screen or board 106. As a result, remote participant 120a may select to view the video feed from video camera 103b. However, remote participant 120b may desire to view video footage of participant 104d. As a result, remote participant 120b may select to view the video feed from video camera 103c. Each remote participant may choose to view video feeds from the same or different video cameras, allowing the remote participants to have individually customized experiences.

In addition to requesting access to a video footage from a video camera, a remote participant may request to have physical remote control of the video camera itself. For example, if granted by the computing device 110, the remote participant may choose to control the direction, zoom, contrast, or other setting of a video camera. Continuing with the example above, remote participant 120a may request to control video camera 103b, in order to follow participant 104f. For example, as participant 104f moves around the conference room 100, remote participant 120a may control the direction of video camera 103b to follow the movement of participant 104f. Similarly, remote participant 120a may control the zoom of video camera 103b, for example, to be able to view presentation materials on board 106. However, if physical control of a video camera is given to a remote participant, similar physical controls may be denied to another remote participant. For example, as remote participant 120a physically controls video camera 103b, another remote participant that prefers to view the video feed from video camera 103b may only be able to view the video feed that is under the control of remote participant 120a. However, the other remote participant may be able to control certain aspects of video camera 103b that does not require physical control of the video camera 103b itself, such as digital zoom.

With regards to audio streams, each remote participant may desire to hear different audio feeds. As an example, the application may provide a preview of the various audio feeds available, for example, from microphones 102a-102f, allowing each remote participant to select their preferred audio feeds. Continuing with the example above, as remote participant 120a may desire to hear participant 104f, particularly when participant 104f is presenting in front of the board 106, remote participant 120a may request to access audio feeds from at least one microphone near participant 104f (e.g., microphone 102c and/or microphone 102d). However, as remote participant 120b may desire to hear participant 104d, remote participant 120b may request to access audio feed from microphone 102f on the device of participant 104d.

The selection of the subset of audio streams from the conference room 100 made by a remote participant may be manual or automatic. For example, as described above, if remote participant 120a desires to follow participant 104f, remote participant 120a may manually request to access audio feeds from at least one microphone near participant 104f (e.g., microphone 102c and/or microphone 102d). However, if participant 104f moves around within the conference room 100, or if the participants in the conference room 100 speak over each other, the manual selection of microphones by the remote participant 120a may not be appropriate. For example, the audio feeds that the remote participant 120a initially requested to access may no longer be appropriate if participant 104f walks to another area of the conference room 100. Otherwise, remote participant 120a may have to constantly change the audio feeds that are being accessed, based on where participant 104f is in the conference room 100.

As an example, rather than making manual requests, a remote participant may specify a participant in the conference room 100 that it wants to adjust audio settings for, and the computing device 110 may select the appropriate audio feeds to make available to the remote participant. As an example, the application installed on the device of the remote participant may provide a graphical representation of the participants in the conference room 100, and the remote participant may specify the participant in the conference room 100 that it wants to adjust audio settings for. The graphical representation of the participants in the conference room 100 may be automatically learned by the computing device 110 during the course of the meeting in the conference room 100, based on a list of participants planning to attend and previously captured voice prints. Otherwise, an in-room participant may locate the other participants in the conference room on a graphical layout that is presented to the remote participants 120a-120n.

Upon specifying a participant in the conference room 100 that the remote participant wants to adjust audio settings for, the computing device 110 may automatically locate and track movements of the specified participant within the conference room 100. As an example, using the microphones 102a-102f, the computing device 110 may use voice pattern matching and acoustic source localization in combination to locate and track movements of the specified participant when the specified participant speaks. As a result, the computing device 110 may automatically assign appropriate audio feeds to the remote participant, based on the current location of the specified participant in the conference room 100.

In addition to requesting access to audio feeds from microphones, a remote participant may request to have physical remote control of the microphones. For example, if granted by the computing device 110, the remote participant may choose to control the volume levels coming from each microphone. The remote participant may even choose to mute a microphone to avoid from hearing a particular participant in the conference room 100 or any side conversations being held in the conference room 100. However, if physical control of a microphone is given to a remote participant, similar physical controls may be denied to another remote participant. For example, as remote participant 120b physically controls microphone 102f, another remote participant that prefers to hear the audio feed from microphone 102f may only be able to hear the audio feed that is under the control of remote participant 120b. As an example, in order to avoid limiting the audio feeds that remote participants prefer to access, rather than granting physical control of the microphones, the computing device 110 may isolate or filter out the voice of specified participant collected by a microphone, and provide the filtered voice as an audio feed to a remote participant. As a result, multiple remote participants may be able to access audio from the same microphone, but receive different audio feeds, based on the participants in the conference room 100 that each remote participant desires to follow.

As an example, requests from remote participants to access streams of content from the recording devices in the conference room 100 may be overridden by participants in the conference room 100 or an administrator. For example, permissions for control of audio and video components may be given to or removed from various remote participants. Even if an administrator grants permission to remote participants for remotely controlling video or audio components, those controls may be overridden by participants in the conference room 100, for example, when the participants in the conference room 100 desire to have the ability to have a side conversation without having their audio or video transferred to the remote participants.

Feed engine 113 represents a combination of hardware and programming configured to join, for each user request, the requested subset of the audio and/or video feeds into a single multimedia stream. For the participants in the conference room 100 that each remote participant desires to follow, the computing device 110 may perform the algorithmic work on manipulating the various audio and/or video feeds to optimize the experience for each remote participant, and permit only a single mixed audio and/or video stream to be transmitted to each remote participant. By consolidating the various feeds into a single multimedia stream, and transmitting only the feeds requested by a remote participant, the bandwidth required for transmitting the feeds to the remote participant may be reduced. Transmit engine 114 represents a combination of hardware and programming configured to transmit each single multimedia stream to respective remote participants. As illustrated in FIG. 1, any number of individually customized feeds may be sent to the remote participants 120a-120n.

Grant engine 115 represents a combination of hardware and programming configured to grant requests by remote participants to control the recording devices located in the conference room. As described above, in addition to requesting access to a feed, the remote participant may request to have physical remote control of the recording device itself (e.g., a video camera or microphone). However, if physical control of a recording device is given to a remote participant, similar physical controls may be denied to another remote participant.

Figure 2:
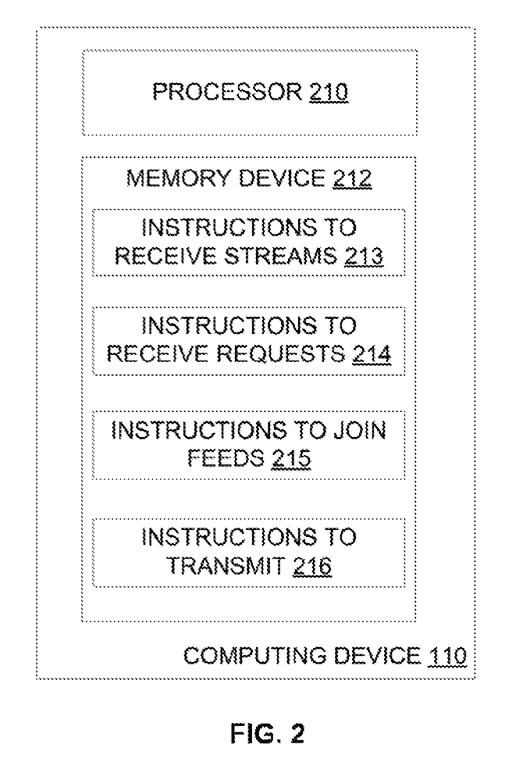
FIG. 2 is a block diagram depicting a memory resource and a processing resource, according to one example.

In the foregoing discussion, engines 111-115 were described as combinations of hardware and programming. Engines 111-115 may be implemented in a number of fashions. Referring to FIG. 2, the programming may be processor executable instructions stored on a tangible memory device 212 and the hardware may include processor 210 for executing those instructions. Thus, memory device 212 can be said to store program instructions that, when executed by processor 210, implement the components of the computing device 110 of FIG. 1.

Memory device 212 represents generally any number of memory components capable of storing instructions that can be executed by processor 210. Memory device 212 is non-transitory in the sense that it does not encompass a transitory signal but instead is made up of at least one memory component configured to store the relevant instructions. As a result, the memory device 212 may be a non-transitory computer-readable storage medium. Memory device 212 may be implemented in a single device or distributed across devices. Likewise, processor 210 represents any number of processors capable of executing instructions stored by memory device 212. Processor 210 may be integrated in a single device or distributed across devices. Further, memory device 212 may be fully or partially integrated in the same device as processor 210, or it may be separate but accessible to that device and processor 210.

In one example, the program instructions can be part of an installation package that when installed can be executed by processor 210 to implement the components of the computing device 110 of FIG. 1. In this case, memory device 212 may be a portable medium such as a CD, DVD, or flash drive or a memory maintained by a server from which the installation package can be downloaded and installed. In another example, the program instructions may be part of an application or applications already installed. Here, memory device 212 can include integrated memory such as a hard drive, solid state drive, or the like.

In FIG. 2, the executable program instructions stored in memory device 212 include instructions to receive streams 213, instructions to receive requests 214, instructions to join feeds 215, and instructions to transmit 216. Instructions to receive streams 213 represents program instructions that when executed cause processor 210 to implement receive engine 111 of FIG. 1. Instructions to receive requests 214 represents program instructions that when executed cause processor 210 to implement request engine 112 of FIG. 1. Instructions to join feeds 215 represents program instructions that when executed cause processor 210 to implement feed engine 113 of FIG. 1. Instructions to transmit 216 represents program instructions that when executed cause processor 210 to implement transmit engine 114 of FIG. 1.

Figure 3:
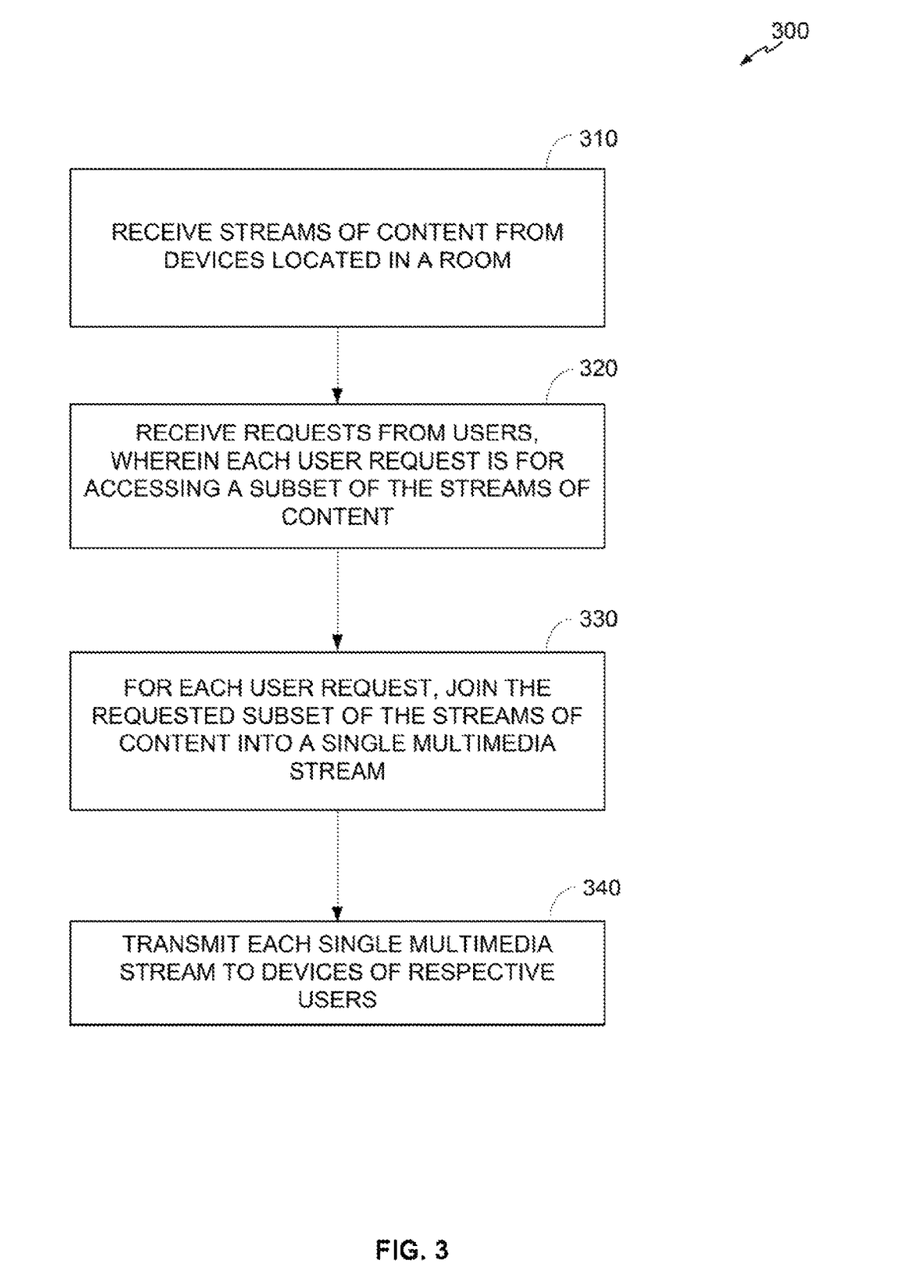
FIG. 3 is a flow diagram in accordance with an example of the present disclosure.

FIG. 3 is a flow diagram 300 of steps taken to implement a method for a computing device to provide the ability for remote participants in a collaborative workspace to hear and view specified participants in a conference room. In discussing FIG. 3, reference may be made to the example scenario illustrated in FIG. 1. Such reference is made to provide contextual examples and not to limit the manner in which the method depicted by FIG. 3 may be implemented.

At 310, the computing device (e.g., computing device 110) receives streams of content (e.g., audio and/or video feeds) from devices located in the conference room. Referring back to FIG. 1, the computing device 110 may receive audio feeds from the microphones 102a-102f and video feeds from the video cameras 103a-103c.

At 320, the computing device receives requests from users (e.g., participants remote from the conference room). As an example, each request is for accessing a subset of the streams of content (e.g., the audio and/or video feeds), based on participants in the room that each user desires to follow. As a result, instead of transmitting the same multimedia stream to all users remote from the room, each user has control over the audio and/or video streams they receive on their respective devices. However, the requests from users to access streams of content from devices located in the room may be overridden by participants in the room or an administrator. As an example, each user request for accessing a subset of the streams of content may correspond to streams of content focused on a participant in the room. As a result, the streams of content accessible to the user may change based on movement of the participant in the room.

In addition to receiving requests for accessing the streams of content, the computing device may receive requests from users to control devices located in the room. As an example, the computing device may grant a request by a first user to control devices located in the room that correspond to streams of content requested by the first user for access. However, the computing device may deny a request by a second user to control the devices located in the room that correspond to the streams of content requested by the first user for access.

At 330, the computing device, for each user request, joins the requested subset of streams of content into a single multimedia stream. For the participants in the room that each user desires to follow, the computing device may perform the algorithmic work on manipulating the various audio and/or video feeds to optimize the experience for each user, and permit only a single mixed audio and/or video stream to be transmitted to each user. By consolidating the various feeds into a single multimedia stream, and transmitting only the feeds requested by a user, the bandwidth required for transmitting the feeds to the user may be reduced. At 340, the computing device transmits each single multimedia stream to devices of respective users. As a result, any number of individually customized feeds may be sent to the users remote from the room.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
receiving streams of content from devices located in a room;
receiving requests from users, wherein each user request is for accessing a subset of the streams of content;
for each user request, joining the requested subset of the streams of content into a single multimedia stream;
transmitting each single multimedia stream to devices of respective users;
granting a request by a first user to control devices located in the room that correspond to streams of content requested by the first user for access; and
denying a request by a second user to control the devices located in the room that correspond to the streams of content requested by the first user for access.

2. The method of claim 1, wherein a user request for accessing a subset of the streams of content corresponds to streams of content focused on a participant in the room.

3. The method of claim 2, wherein the streams of content joined, into the single multimedia stream changes based on movement of the participant in the room.

4. The method of claim 1, wherein requests from users to access streams of content from devices located in the room are overridden by participants in the room or an administrator.

5. A system comprising:
recording devices located in a room; and
a computing device comprising:
- a receive engine to receive streams of content from the recording devices;
- a request engine to receive requests from users, wherein each user request is for accessing a subset of the streams of content, and wherein requests from users to access streams of content from devices located in the room are overridden by participants in the room or an administrator;
- for each user request, a feed engine to join the requested subset of the streams of content into a single multimedia stream;
- a transmit engine to transmit each single multimedia stream to respective users; and
- a grant engine to grant requests by users to control the recording devices located in the room.

6. The system of claim 5, wherein the grant engine to grant the requests comprises:
- granting a request by a first user to control recording devices located in the room that correspond to streams of content requested by the first user for access; and
- denying a request by a second user to control the recording devices located in the room that correspond to the streams of content requested by the first user for access.

7. The system of claim 5, wherein a user request for accessing a subset of the streams of content corresponds to streams of content focused on a participant in the room.

8. The system of claim 7, wherein the streams of content joined into the single multimedia stream changes based on movement of the participant in the room.

9. A non-transitory computer-readable storage medium comprising programming instructions which, when executed by a processor, to cause the processor to:
- receive streams of content from devices located in a room;
- receive requests from users, wherein each user request is for accessing a subset of the streams of content corresponding to a participant in the room selected by the user;
- for each user request, join the requested subset of the streams of content into a single multimedia stream;
- transmit each single multimedia stream to respective users;
- grant a request by a first user to control devices located in the room that correspond to streams of content requested by the first user for access; and
- deny a request by a second user to control the devices located in the room that correspond to the streams of content requested by the first user for access.

10. The non-transitory computer-readable storage medium of claim 9, wherein the streams of content joined into the single multimedia stream changes based on movement of the participant in the room.

* * * * *

UNITED STATES PATENT AND TRADEMARK OFFICE
CERTIFICATE OF CORRECTION

PATENT NO.        : 10,015,447 B2
APPLICATION NO.   : 15/542826
DATED             : July 3, 2018
INVENTOR(S)       : Mann et al.

Page 1 of 1

It is certified that error appears in the above-identified patent and that said Letters Patent is hereby corrected as shown below:

In Column 8, Line 66 (approx.), in Claim 3, delete "joined," and insert -- joined --, therefor.

Signed and Sealed this
Twenty-sixth Day of February, 2019

Andrei Iancu
*Director of the United States Patent and Trademark Office*